United States Patent
Huang

(10) Patent No.: US 12,303,439 B2
(45) Date of Patent: May 20, 2025

(54) DRIVE WHEEL FOR WHEELCHAIR AND QUICK-RELEASABLE DRIVE WHEEL ASSEMBLY

(71) Applicant: TUNG KENG ENTERPRISE CO., LTD., Taichung (TW)

(72) Inventor: Chia-Yen Huang, Taichung (TW)

(73) Assignee: Tung Keng Enterprise Co., Ltd, Taichung (TW)

( * ) Notice: Subject to any disclaimer, the term of this patent is extended or adjusted under 35 U.S.C. 154(b) by 488 days.

(21) Appl. No.: 17/940,105

(22) Filed: Sep. 8, 2022

(65) Prior Publication Data
US 2024/0082081 A1    Mar. 14, 2024

(51) Int. Cl.
*A61G 5/04*    (2013.01)
*B60K 1/04*    (2019.01)
*B60K 7/00*    (2006.01)

(52) U.S. Cl.
CPC ............... *A61G 5/041* (2013.01); *B60K 1/04* (2013.01); *B60K 7/0007* (2013.01); *B60K 2001/045* (2013.01); *B60Y 2200/84* (2013.01)

(58) Field of Classification Search
CPC ........ A61G 5/041; B60K 1/04; B60K 7/0007; B60K 2001/045; B60Y 2200/84
See application file for complete search history.

(56) References Cited

U.S. PATENT DOCUMENTS

| | | | | |
|---|---|---|---|---|
| 9,445,959 B2 * | 9/2016 | Kim | ................... | A61G 5/041 |
| 2012/0326449 A1 * | 12/2012 | Liao | ................... | B60L 15/2054 |
| | | | | 290/1 C |
| 2023/0225917 A1 * | 7/2023 | Wolters | ................... | H02K 24/00 |
| | | | | 301/6.5 |
| 2024/0082081 A1 * | 3/2024 | Huang | ................... | A61G 5/041 |
| 2024/0207118 A1 * | 6/2024 | Raiskup | ................... | A61G 5/047 |
| 2024/0293272 A1 * | 9/2024 | Noll | ................... | A61G 5/041 |

FOREIGN PATENT DOCUMENTS

KR    20220032820 A  *  3/2022

* cited by examiner

*Primary Examiner* — Jacob B Meyer
(74) *Attorney, Agent, or Firm* — Apex Juris, pllc; R. Lynette Wylie

(57) ABSTRACT

A drive wheel for a wheelchair includes a wheel hub motor, wherein the wheel hub motor has a connecting structure and an output end at a side that is opposite to the connecting structure. The output end is engaged with a wheelchair wheel. The wheel hub motor is surrounded by a receiving case. The receiving case has a control terminal block that is electrically connected to a battery module and a control board which are disposed in the receiving case. Since a portion of the battery module is disposed in the receiving case, the battery module of the wheelchair are separately disposed in drive wheels and the main body of the wheelchair, so that the weight of the battery module is distributed, thereby reducing the weight of the main body and keeping the drive wheel liftable. With such design, the wheelchair could be easily transported and assembled.

8 Claims, 10 Drawing Sheets

DRIVE WHEEL FOR WHEELCHAIR AND QUICK-RELEASABLE DRIVE WHEEL ASSEMBLY

BACKGROUND OF THE INVENTION

Technical Field

The present invention relates generally to a wheelchair, and more particularly to a drive wheel for a wheelchair and a quick-releasable drive wheel assembly.

Description of Related Art

A battery module and a control board of a conventional electric wheelchair are disposed in a main body under a seat of the electric wheelchair. A controller is disposed on an armrest and is electrically connected to the control board. Two drive wheels are mounted to the left and right sides of the main body of the wheelchair, respectively. When a user operated the electric wheelchair via the controller, the two drive wheels are controlled to rotate either in the same direction or in opposite directions, so that the wheelchair could move forward or backward and turn right or left.

The conventional electric wheelchair is driven by the electric motor and is laborsaving. However, since the entire battery module of the wheelchair is mounted in the main body of the wheelchair, the weight of the main body of the wheelchair is extremely heavy. Even though the drive wheels could be detached from the wheelchair, the weight of the main body of the wheelchair is too heavy to be lifted by a single person. Thus, it is hard to assemble, disassemble, transport, or store the electric wheelchair solely without assistance from other people.

BRIEF SUMMARY OF THE INVENTION

In view of the above, the primary objective of the present invention is to provide a drive wheel that could be disposed with a battery module, so that the battery module of the wheelchair could be separately mounted into a main body and the two drive wheels of the wheelchair to distribute the weight of the battery module, thereby allowing the main body and the drive wheels of the wheelchair to be lifted and moved into a trunk by a single person. Additionally, after the main body and the drive wheels of the wheelchair are taken out of the trunk, the wheelchair could be assembled more easily.

The present invention provides a drive wheel for a wheelchair, including a wheel hub motor, a wheelchair wheel, and a power supply assembly. A side of the wheel hub motor has a connecting structure, and another side of the wheel hub motor, which is opposite to the side having the connecting structure, has an output end at the middle of the another side of the wheel hub motor. The output end of the wheel hub motor is engaged with a center portion of the wheelchair wheel. The power supply assembly has a receiving case, wherein the wheel hub motor is surrounded by the receiving case. The receiving case includes a control terminal block, and a battery module and a control board are disposed in the receiving case. The control board, the battery module, the control terminal block, and the wheel hub motor are electrically connected.

With the aforementioned design, since the battery module is disposed in the drive wheel to supply electric energy to the wheel hub motor, the weight of the main body of the wheelchair is reduced due to the distribution of the battery module. As a result, the weight of the main body and the weight of the drive wheels are reduced to a degree that the main body of the wheelchair and the two drive wheels could be carried by a single person, thereby facilitating the user to assemble, disassemble, transport, or store the wheelchair by the user.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
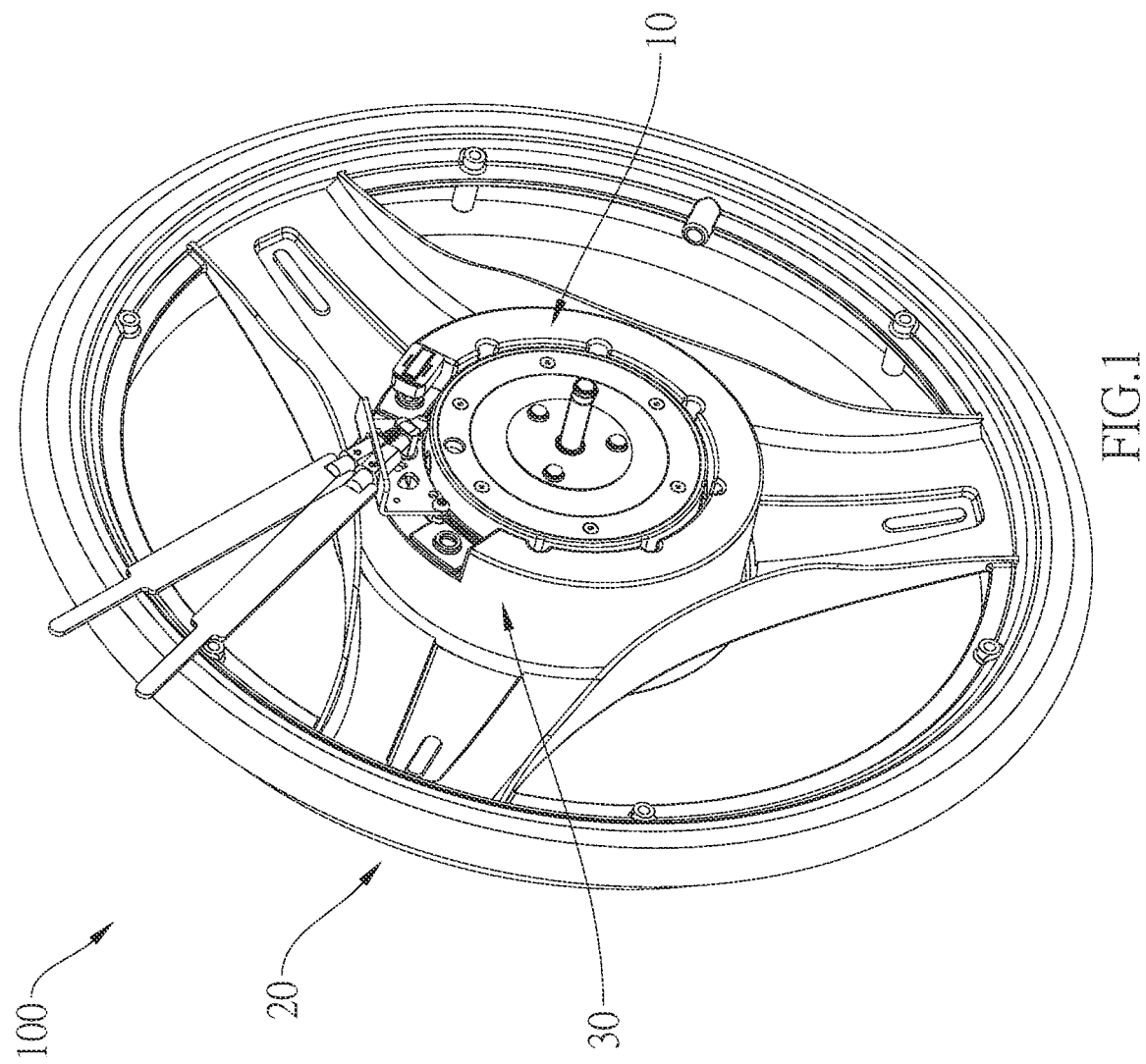
FIG. 1 is a perspective view of the drive wheel of an embodiment according to the present invention.
Figure 2:
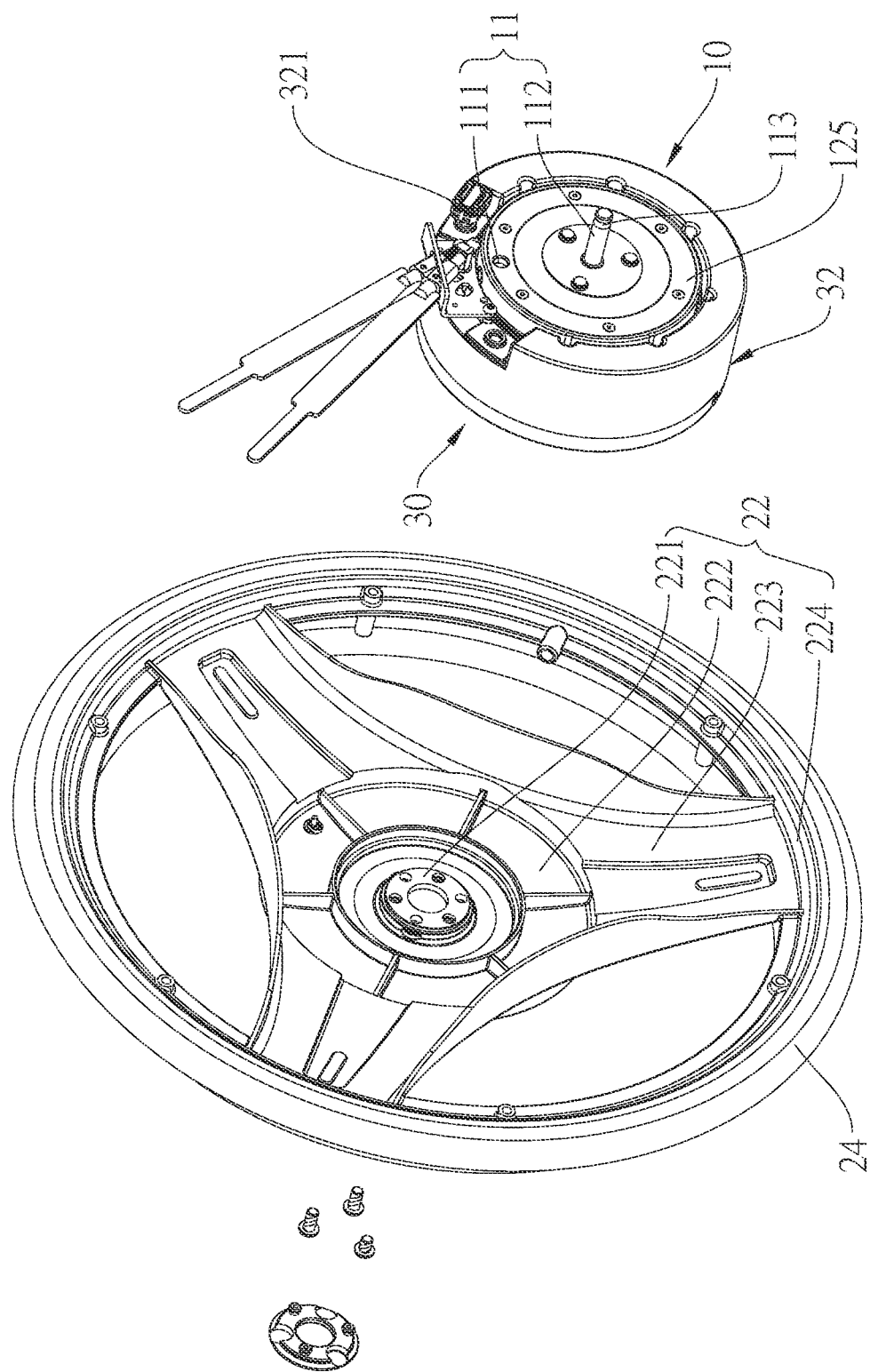
FIG. 2 is an exploded view of the drive wheel of the embodiment according to the present invention.
Figure 3:
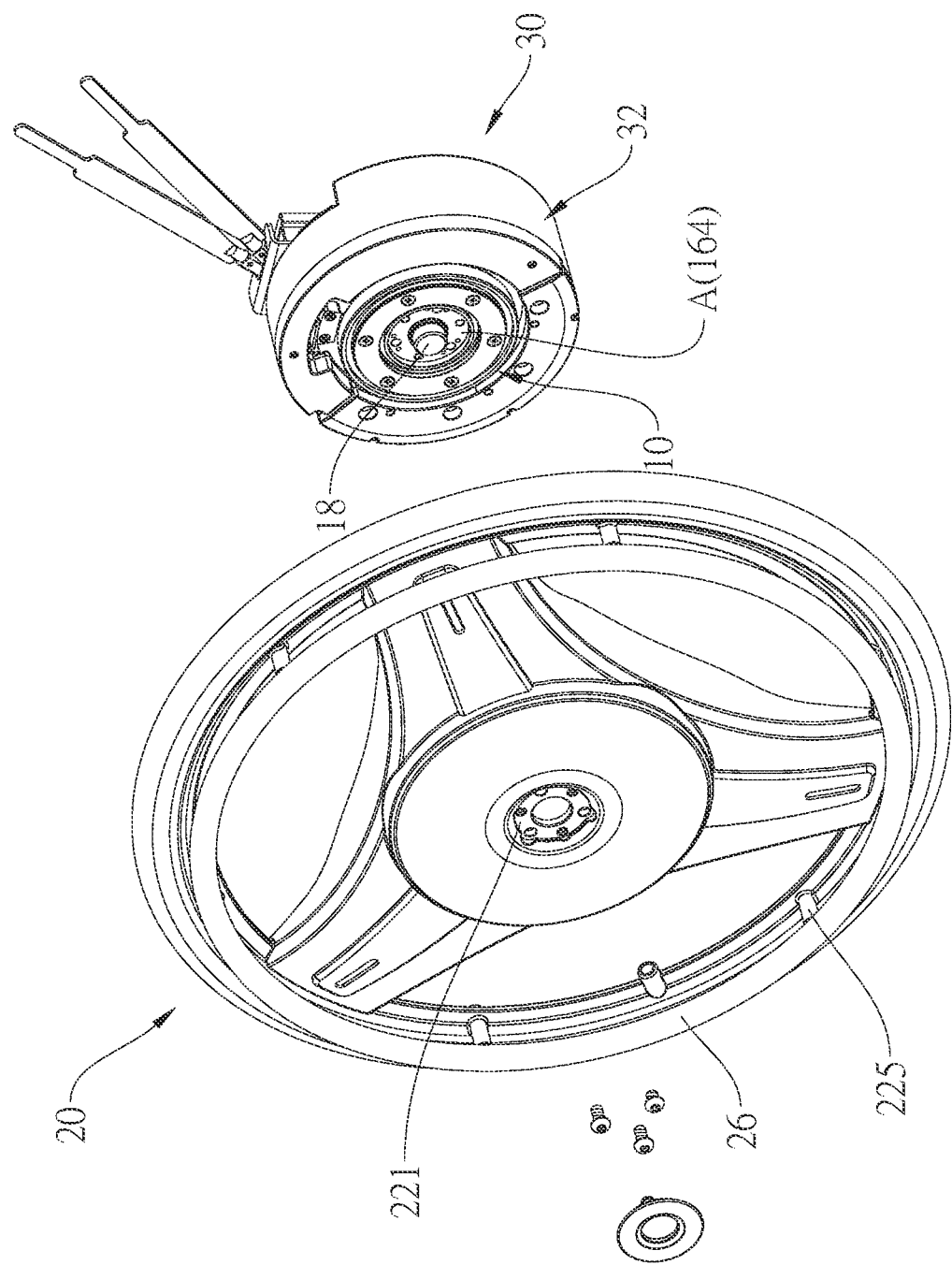
FIG. 3 is an exploded view of the drive wheel of the embodiment according to the present invention seen from another perspective.
Figure 4:
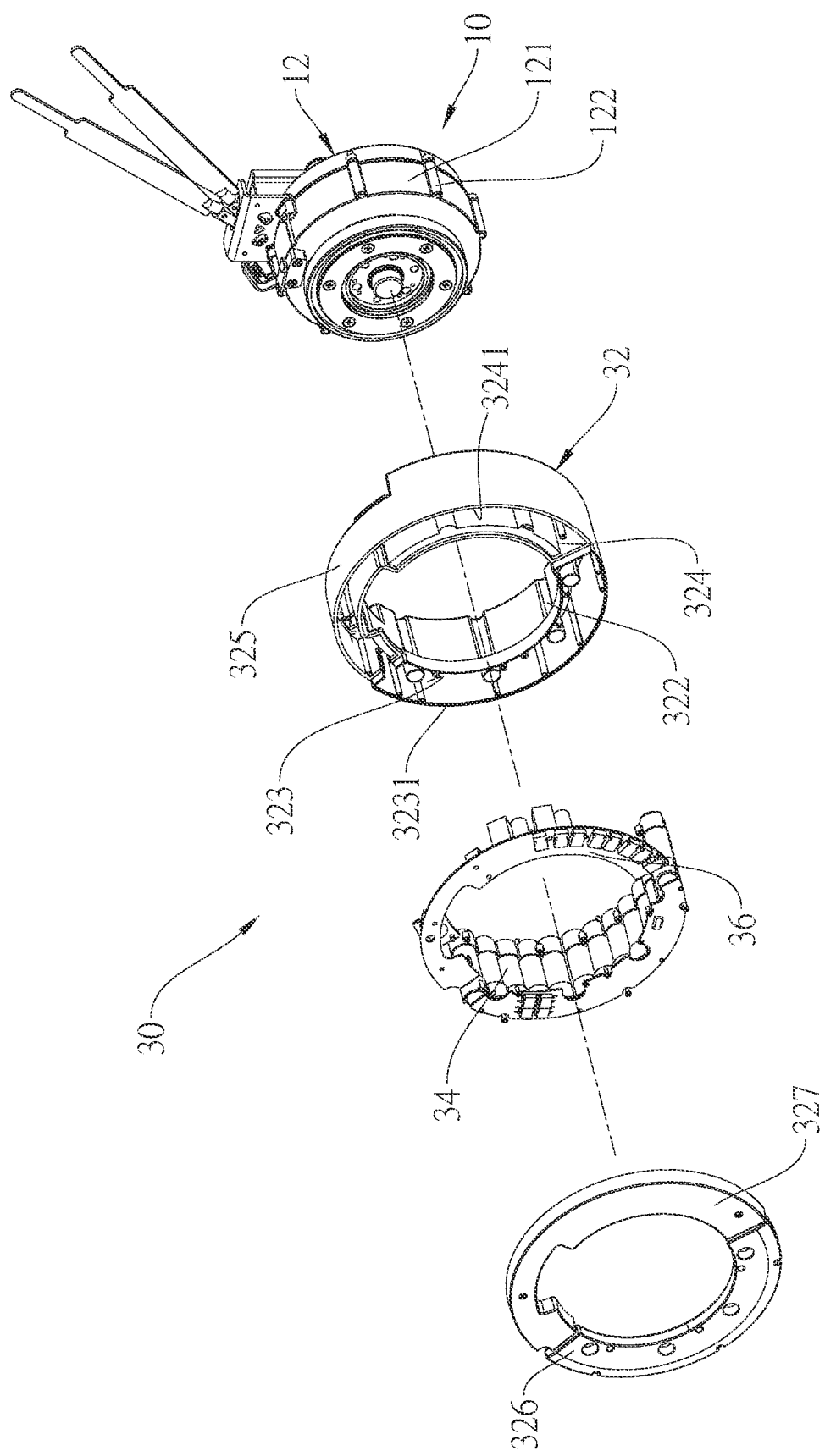
FIG. 4 is an exploded view of the wheel hub motor and the power supply assembly in FIG. 3.
Figure 5:
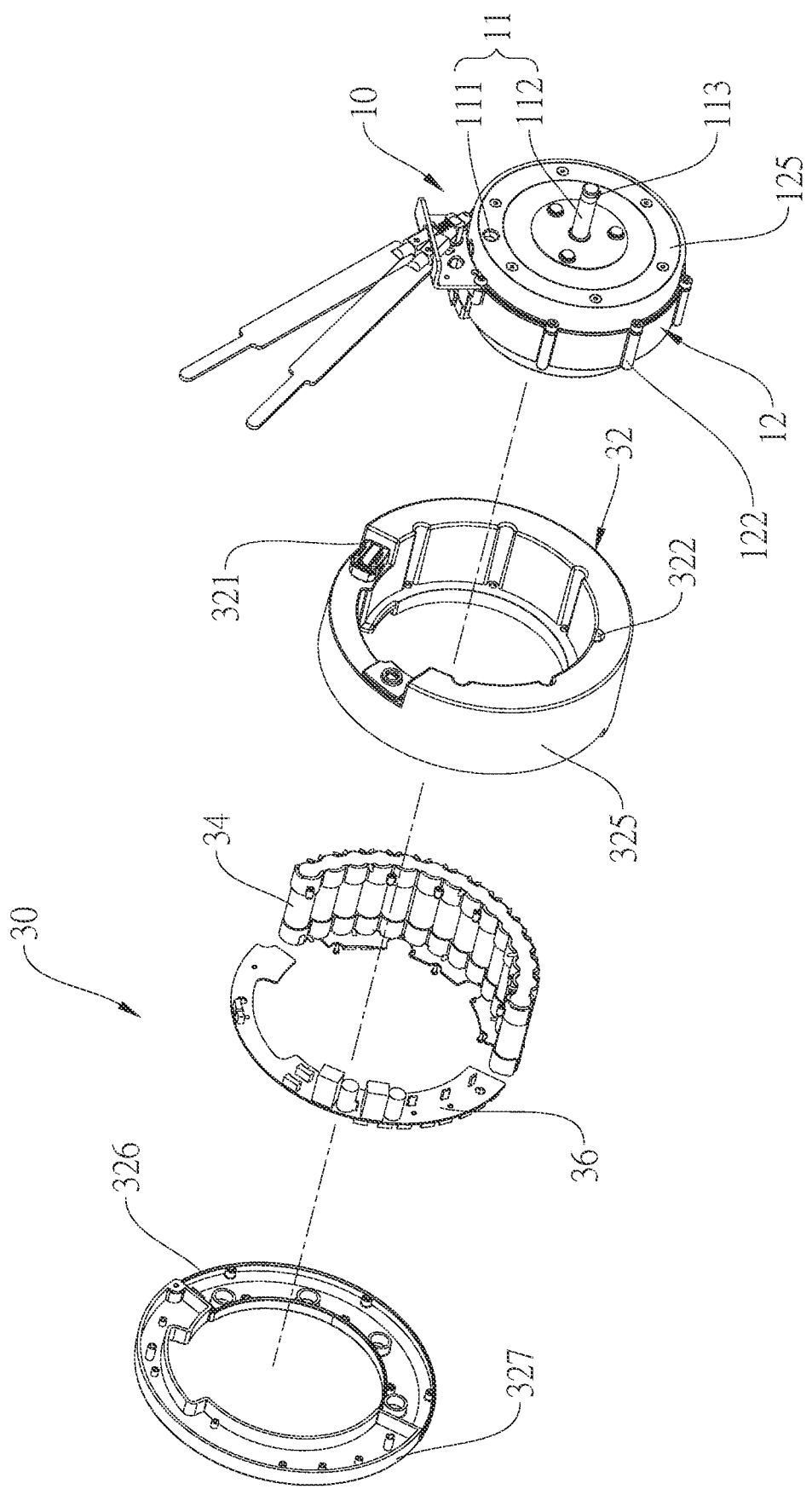
FIG. 5 is an exploded view of the wheel hub motor and the power supply assembly in FIG. 3 seen from another perspective.

As illustrated in FIG. 1 to FIG. 5, a drive wheel 100 of an embodiment according to the present invention for a wheelchair includes a wheel hub motor 10, a wheelchair wheel 20, and a power supply assembly 30, wherein the wheel hub motor 10 is engaged with the wheelchair wheel 20, and the power supply assembly 30 is disposed around the wheel hub motor 10.

In the current embodiment, the wheel hub motor 10 is an internal rotor motor. A side of the wheel hub motor 10 has a connecting structure 11, such as a plurality of lugs for being penetrated by a screw or other quick-release structures for coupling the wheel hub motor 10 and a main body of the wheelchair. A center position of another side of the wheel hub motor 10, which is opposite to the side having the connecting structure 11, has an output end A.

The wheelchair wheel 20 has a rim 22 and a tire 24 that fits around the rim 22, wherein the rim 22 includes a lock base 221, a center disc 222, a plurality of spokes 223, and a wheel barrel 224. The lock base 221 is located at a center portion of the rim 22 and is surrounded by a center disc 222. A plurality of spokes 223 extends away from a circumference of the center disc 222 and connects the wheel barrel 224 and the center disc 222. A plurality of supports 225 is disposed on the wheel barrel 224 and is connected to a push ring 26. By inserting screws through the lock base 221 at the middle of the wheelchair wheel 20, the lock base 221 is engaged with the output end A of the wheel hub motor 10.

The power supply assembly 30 has a receiving case 32, wherein the receiving case 32 is in an annular-cylinder shape, and the wheel hub motor 10 is surrounded by the receiving case 32. In the current embodiment, the receiving case 32 is annular and fits around a circumference of the wheel hub motor. In other embodiment, the receiving case 32 could be a case in an arc shape or other shapes and could be engaged with the wheel hub motor 10 by screw or by interlocking. The receiving case 32 includes a control terminal block 321. A battery module 34 and a control board 36 are disposed in the receiving case 32. The control board 36, the battery module 34, the control terminal block 321, and the wheel hub motor 10 are electrically connected. After the control terminal block 321 receives a control signal, the control signal is transmitted to the control board 36 to control the wheel hub motor 10 to operate, and the battery module 34 is adapted to supply the electrical energy to the wheel hub motor 10.

In the current embodiment, the drive wheel 100 is connected to the main body of the wheelchair via the connecting structure 11, wherein the control terminal block 321 is adapted to be connected to a control connector of the main body of the wheelchair for receiving the control signal. After the control signal is received by the control terminal block 321, the wheel hub motor 10 is driven to drive the wheelchair wheel 20 to rotate according to the control signal. Since the battery module 34 that is adapted to provide the electrical energy to the wheel hub motor 10 is disposed in the power supply assembly 30, the battery disposed in the main body of the wheelchair could be reduced or omitted, thereby reducing a weight of the main body of the wheelchair. As a result, the weight of the main body of the wheelchair and the weight of each of drive wheels 100 could be reduced to a degree that the main body of the wheelchair and the two drive wheels 100 could be carried or lifted by a single person, which facilitates a user to transport the wheelchair (i.e. after the wheelchair is disassembled, the drive wheels 100 and the main body of the wheelchair could be easily carried and moved).

Figure 6:
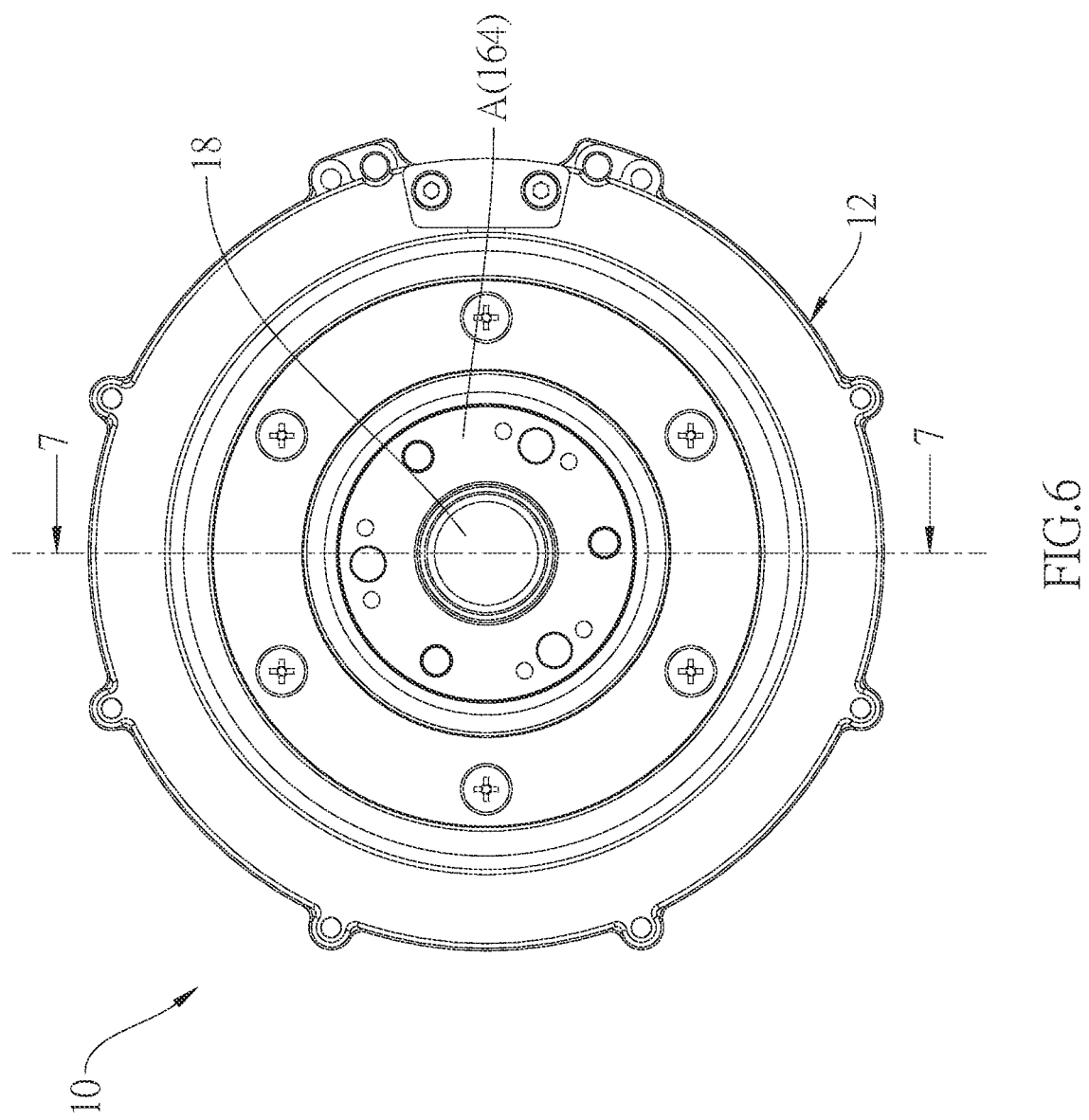
FIG. 6 is a side view of the wheel hub motor in FIG. 5.
Figure 7:
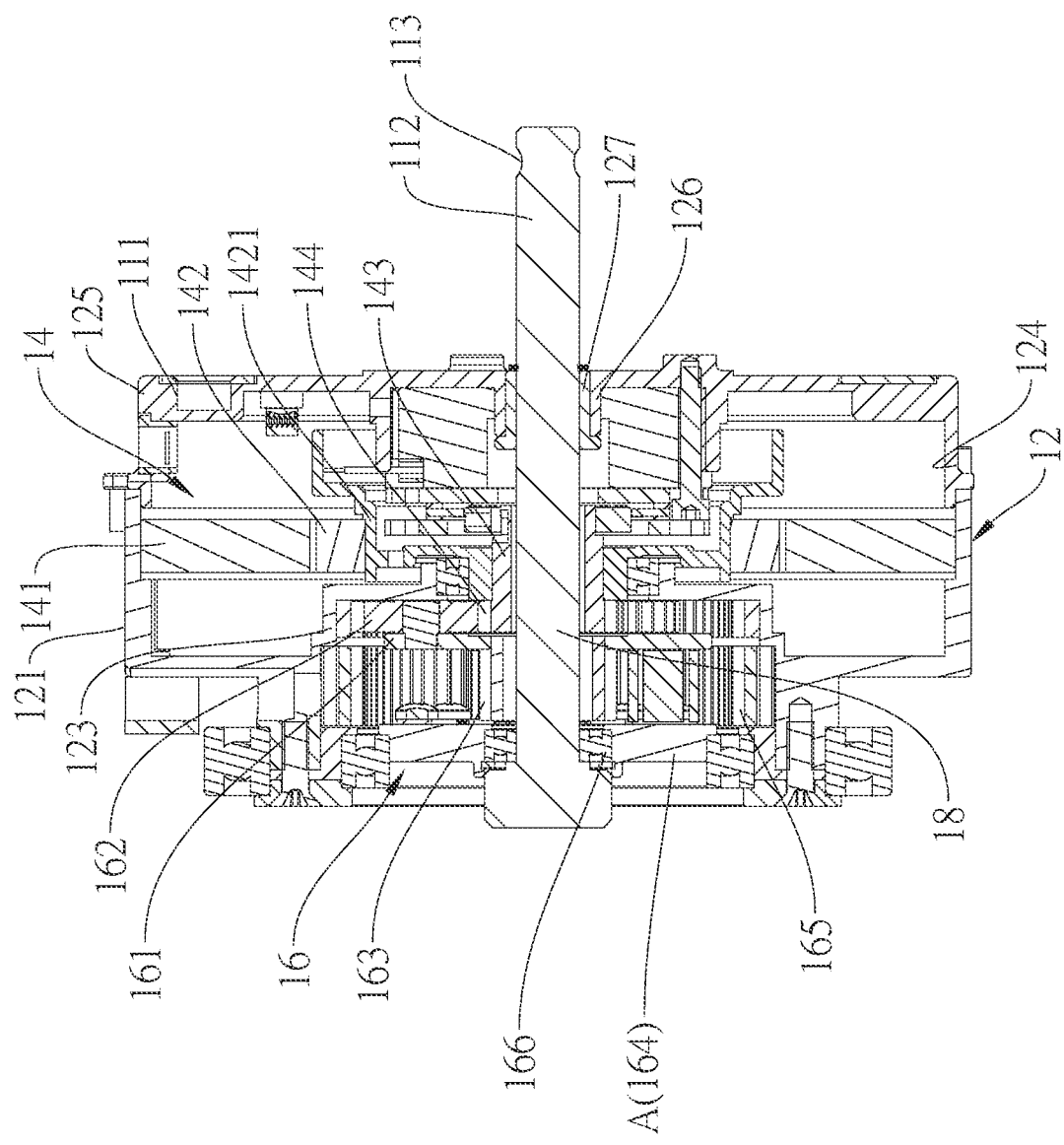
FIG. 7 is a sectional view taken along the 7-7 line in FIG. 6.

As illustrated in FIG. 4 to FIG. 7, the wheel hub motor 10 has a housing 12. The housing 12 includes a circumferential wall 121, wherein the circumferential wall 121 is annular and has a plurality of protruding ribs 122 that protrude away from the wheel hub motor 10. The receiving case 32 of the power supply assembly 30 is a cylindrical case and fixedly fits around the circumferential wall 121 of the wheel hub motor 10. An inner circumference of the receiving case 32 has a plurality of slots 322, wherein the protruding ribs 122 on the housing 12 are interlocked with the slots 322 on the receiving case 32 to position. A space in the receiving case 32 is divided into a first chamber 323 for receiving the battery module 34 and a second chamber 324 for receiving the control board 36.

More specifically, the receiving case 32 includes a cover housing 325 in an annular-cylinder shape. The control terminal block 321 is disposed on the cover housing 325. An internal space of the cover housing 325 is divided into the first chamber 323 and the second chamber 324. The first chamber 323 has a first opening 3231, and the second chamber 324 has a second opening 3241. The cover housing 325 is engaged with a first base 326 to cover the first opening 3231, wherein the battery module 34 is engaged with the first base 326 and is disposed in the first chamber 323. The cover housing 325 is engaged with a second base 327 to cover the second opening 3241, wherein the control board 36 is engaged with the second base 327 and is disposed in the second chamber 324.

The wheel hub motor 10 includes an electrical machine 14 and a reduction gear assembly 16 in the housing 12, wherein the electrical machine 14 is disposed in the wheel hub motor 10 and is engaged with the reduction gear assembly 16. The control board 36 is electrically connected to the electrical machine 14 to control the operation of the wheel hub motor 10. The housing 12 has a seat 123 for receiving the reduction gear assembly 16, wherein the seat 123 is formed by extending inwardly from an edge of the circumferential wall 121, and another edge of the circumferential wall 121, which is opposite to the edge having the seat 123, forms an opening 124. The another edge of the circumferential wall 121 is engaged with an end cap 125, and the opening 124 is covered by the end cap 125. The end cap 125 is located at a side of the housing 12 that is opposite to the output end A. The end cap 125 has a bearing bracket 126 that is formed by extending axially toward the seat 123 from a center portion of the end cap 125. An inner bearing 127 is embedded in the bearing bracket 126. A shaft 18 passes through the inner bearing 127 to allow the shaft 18 to rotatably inserted through the center portion of the housing 12. The electrical machine 14 and the reduction gear assembly 16 surrounds a circumference of the shaft 18.

The electrical machine 14 includes a stator 141 and a rotor 142, wherein the stator 141 is fixed on an inner surface of the circumferential wall 121, and the rotor 142 is located at an inner side of the stator 141. The rotor 142 is connected to a circumference of a sleeve 143 via a rotor seat 1421, wherein the rotor seat 1421 is disc-shaped. The rotor seat 1421 and the sleeve 143 are rotatably disposed in the housing 12 and surround the shaft 18. An end portion of the sleeve 143 forms a first sun gear 144. The reduction gear assembly 16 is disposed on the seat 123. A side of the reduction gear assembly 16 that is adjacent to the electrical machine 14 has a first planetary carrier 161, wherein the first planetary carrier 161 is in an annular shape, and a plurality of first planet gears 162 are pivotally connected to an edge portion of the first planetary carrier 161. The first planet gears 162 are meshed with the first sun gear 144. A second sun gear 163 is disposed at the middle of the first planetary carrier 161 and is a hollowed gear.

A second planetary carrier 164 is disposed at a side of the reduction gear assembly 16 that is opposite to the electrical machine 14 and is an annular body. A plurality of second planet gears 165 is pivotally connected to an edge of the second planetary carrier 164, wherein the second planet gears 165 are meshed with the second sun gear 163. The second planetary carrier 164 is the output end A of the reduction gear assembly 16, and a portion of the second planetary carrier 164 does not be covered by the seat 123 and is exposed outside. An outer bearing 166 is embedded in an inner circumference of the second planetary carrier 164. The shaft 18 has two opposite end portions and a middle portion, wherein the middle portion is located between the two opposite end portions. The two opposite end portions of the shaft 18 pass through the inner bearing 127 and the outer bearing 166, respectively. The middle portion of the shaft 18 passes through the sleeve 143 and a space between the second planet gears 165, so that the second planetary carrier 164 rotatably surrounds the shaft 18.

Figure 8:
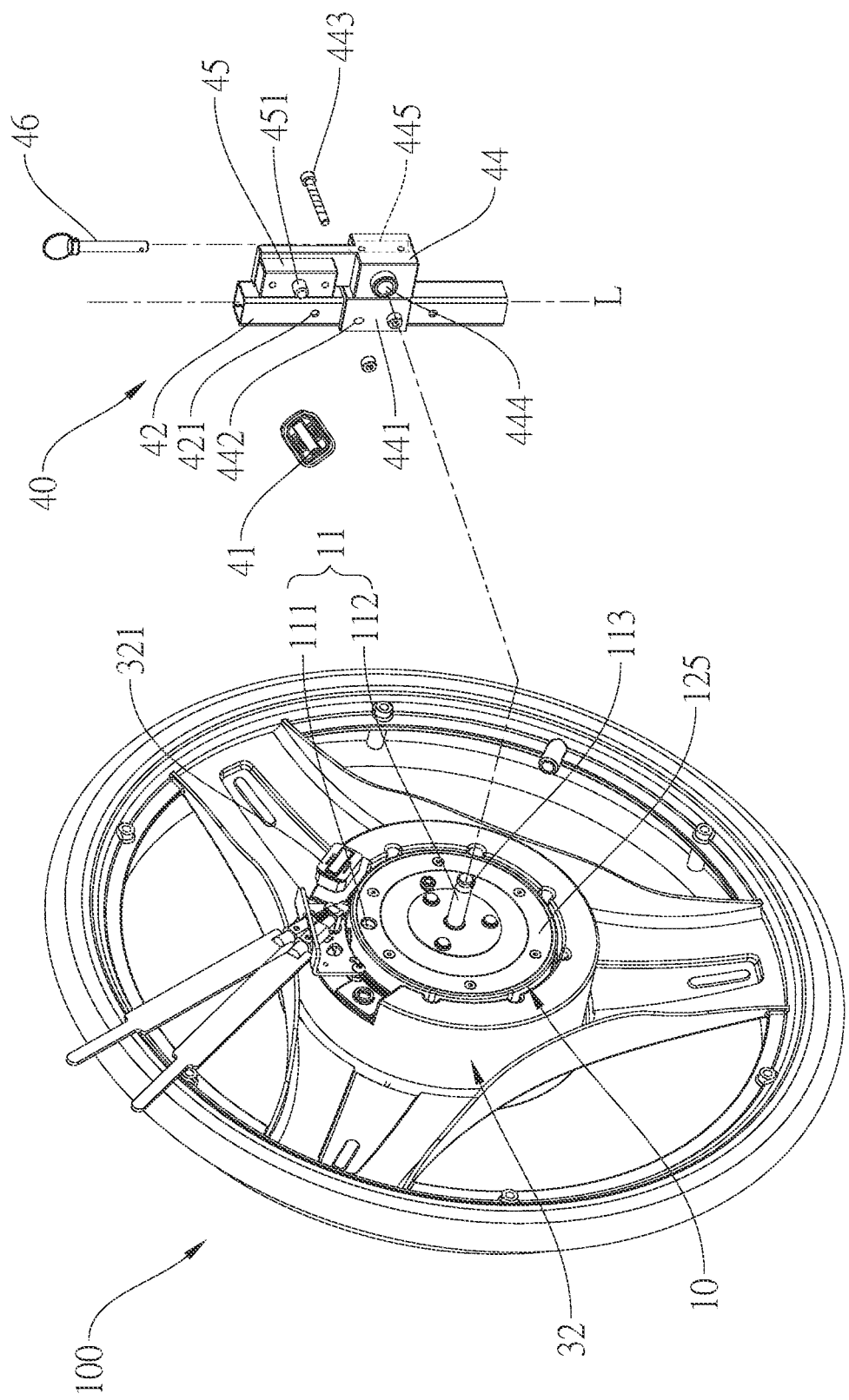
FIG. 8 is an exploded view of the quick-releasable drive wheel of another embodiment according to the present invention, showing the drive wheel and the power supply assembly.
Figure 9:
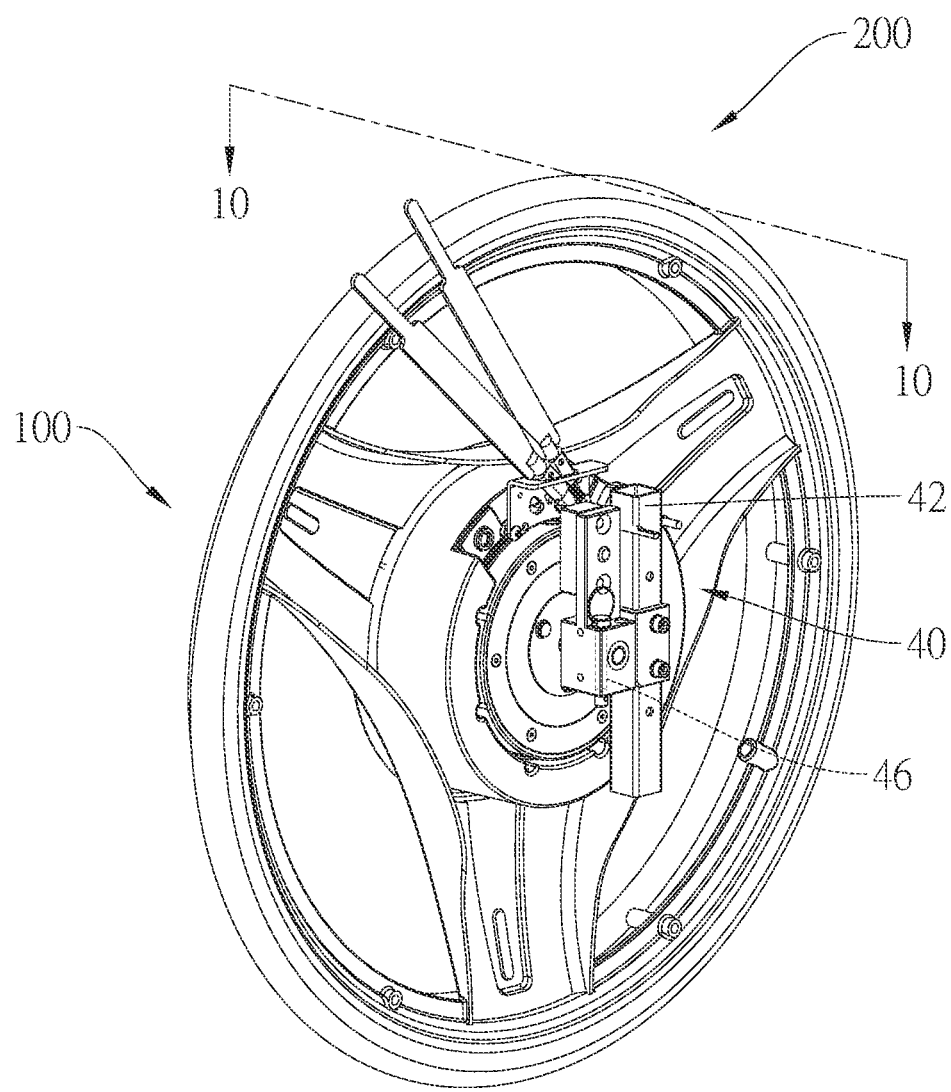
FIG. 9 is a perspective view of the quick-releasable drive wheel of the embodiment according to the present invention.
Figure 10:
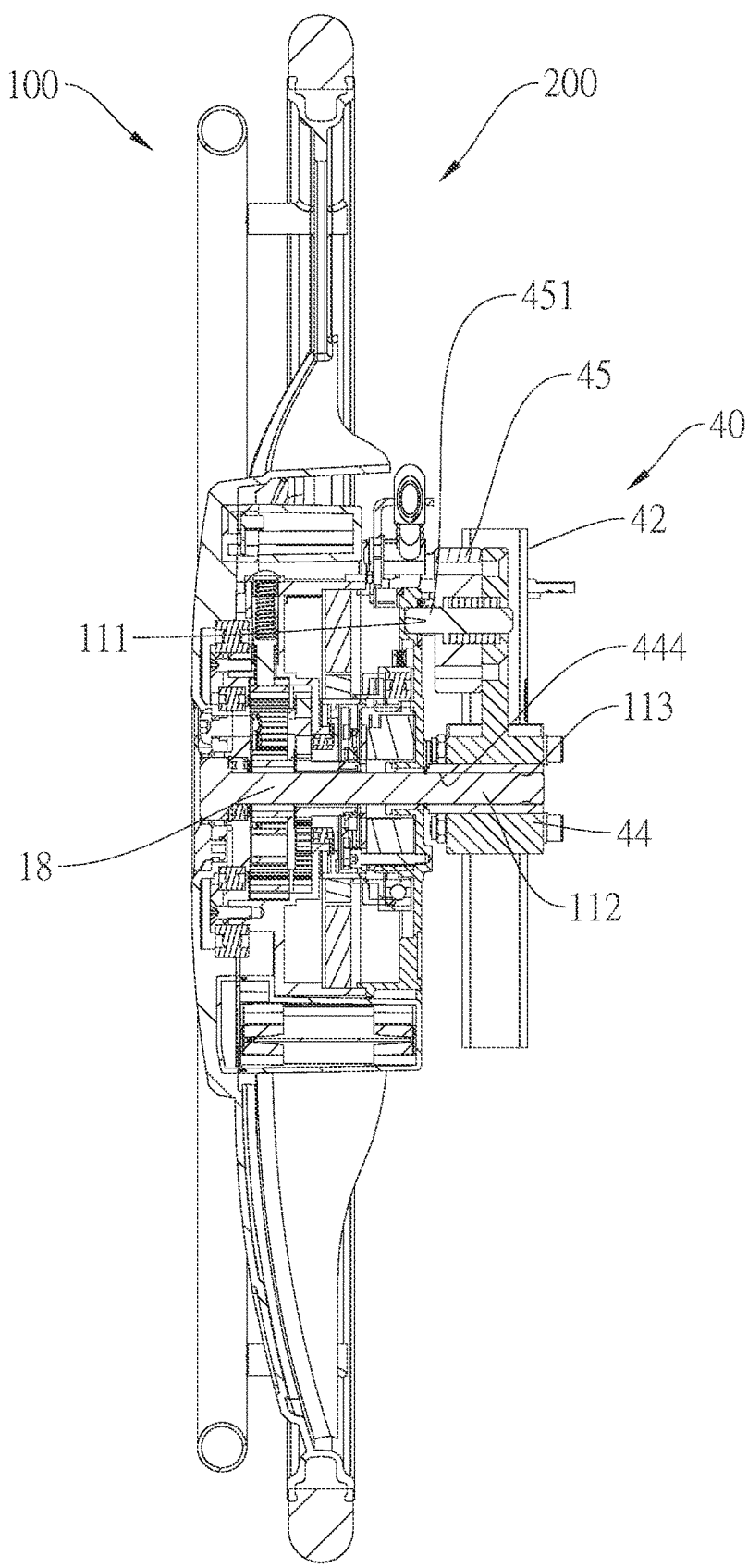
FIG. 10 is a sectional view taken along the 10-10 line in FIG. 9.

As illustrated in FIG. 7 to FIG. 10, the drive wheel 100 of the current embodiment is adapted to be engaged with the main body of the wheelchair, wherein the drive wheel 100 is detachably engaged with the main body of the wheelchair via a quick-release assembly 40. The drive wheel 100 is connected to the quick-release assembly 40 via the connecting structure 11 to form a quick-releasable drive wheel assembly 200. The main body of the wheelchair has a control connector 41 for outputting the control signal. The control connector 41 is detachably inserted into the control terminal block 321 of the receiving case 32. The control connector 41 is complementary to the control terminal block 321, and the control connector 41 and the control terminal block 321 are disposed magnetic members to allow the control connector 41 to be magnetically attracted by the control terminal block 321. The connecting structure 11 of the drive wheel 100 includes a recess 111 located on an edge of the end cap 125 and a protruding portion 112 of the shaft 18, wherein the protruding portion 112 is a portion that protrudes out of the end cap 125. A circumference of the protruding portion 112 has a positioning groove 113 that is annular.

The quick-release assembly 40 includes a connecting rod 42, a shaft seat 44, and a button seat 45, wherein the connecting rod 42 is connected to the shaft seat 44, and the shaft seat 44 is connected to the button seat 45. The connecting rod 42 is adapted to be connected to the main body of the wheelchair by welding, screwing, or other manners. The connecting rod 42 has a plurality of positioning holes 421 that are spaced and arranged along an axis L of the connecting rod 42. The shaft seat 44 is connected to a connecting frame 441, and the connecting frame 441 fits around the connecting rod 42. The connecting frame 441 has two fixing holes 442 that are spaced and arranged along the axis L of the connecting rod 42. When the two fixing holes 442 on the connecting frame 441 are aligned with the positioning holes 421 on the connecting rod 42, each of fasteners 443 is inserted through one of the two fixing holes 442 and corresponding one of the positioning holes 421 on the connecting rod 42 to fix the shaft seat 44 to the connecting rod 42. A position where the connecting frame 441 is fixed to the connecting rod 42 is adjustable by aligning the fixing holes 442 on the connecting frame 441 with other positioning holes 421 on the connecting rod 42. The shaft seat 44 has an inserted hole 444 and a perforation 445, wherein the inserted hole 444 communicates with a perforation 445, and an extending direction of the inserted hole 444 is perpendicular to an extending direction of the perforation 445. The button seat 45 connected to the shaft seat 44 includes a button 451, wherein the button 451 could return after the button 451 is pressed by an external force.

When the drive wheel 100 is detachably connected to the quick-release assembly 40 via the connecting structure 11, the protruding portion 112 of the connecting structure 11 is inserted into the inserted hole 444 of the shaft seat 44, and a pin 46 is inserted into the perforation 445. The pin 46 abuts against a side of the positioning groove 113 to restrict the protruding portion 112 from leaving the inserted hole 444, and the protruding portion 112 is still rotatable in the inserted hole 444. At the same time, the end cap 125 presses the button 451 to make the button 451 is retracted into the button seat 45. After that, a user rotates the drive wheel 100 to align the recess 111 on the wheel hub motor 10 with the button 451, so that the button 451 is returned to insert into the recess 111, thereby fixing the orientation of the drive wheel 100. Finally, the control connector 41 of the wheelchair is connected to the control terminal block 321 to complete an operation of detachably engaging the drive wheel 100 with the quick-release assembly 40.

It must be pointed out that the embodiment described above is only a preferred embodiment of the present invention. All equivalent structures which employ the concepts disclosed in this specification and the appended claims should fall within the scope of the present invention.

What is claimed is:

1. A drive wheel for a wheelchair, comprising:
a wheel hub motor, wherein a side of the wheel hub motor has a connecting structure, and another side of the wheel hub motor, which is opposite to the side having the connecting structure, has an output end at the middle of the another side of the wheel hub motor;
a wheelchair wheel, wherein the output end of the wheel hub motor is engaged with a center portion of the wheelchair wheel; and
a power supply assembly having a receiving case, wherein the wheel hub motor is surrounded by the receiving case; the receiving case comprises a control terminal block, and a battery module and a control board are disposed in the receiving case; the control board, the battery module, the control terminal block, and the wheel hub motor are electrically connected.

2. The drive wheel as claimed in claim 1, wherein the receiving case is in an annular-cylinder shape and fits around a circumference of the wheel hub motor.

3. The drive wheel as claimed in claim 2, wherein the circumference of the wheel hub motor has a plurality of protruding ribs, and an inner circumference of the receiving case has a plurality of slots; the plurality of protruding ribs of the wheel hub motor is interlocked with the plurality of slots of the receiving case to position.

4. The drive wheel as claimed in claim 2, wherein a space in the receiving case is divided into a first chamber and a second chamber; the battery module is disposed in the first chamber, and the control board is disposed in the second chamber.

5. The drive wheel as claimed in claim 4, wherein the receiving case comprises a cover housing in an annular-cylinder shape, and the control terminal block is disposed on the cover housing; an internal space of the cover housing is divided into the first chamber and the second chamber; the first chamber has a first opening, and the second chamber has a second opening; the cover housing is engaged with a first base to cover the first opening, and the battery module is engaged with the first base; the cover housing is engaged with a second base to cover the second opening, wherein the control board is engaged with the second base.

6. The drive wheel as claimed in claim 1, wherein the wheel hub motor has a housing, and a shaft passes through a center portion of the housing; a side of housing, which is opposite to the output end, has an end cap; the output end is an annular body and rotatably surrounds the shaft; the connecting structure comprises a recess on the end cap and a protruding portion of the shaft; the recess is located on an edge of the end cap, and the protruding portion is a portion of the shaft that protrudes out of the end cap; a circumference of the protruding portion has a positioning groove that is annular.

7. A quick-releasable drive wheel assembly, comprising:
a quick-release assembly adapted to be connected to a main body of a wheelchair and having a shaft seat, wherein the shaft seat has an inserted hole and a perforation, wherein the inserted hole communicates with a perforation, and an extending direction of the inserted hole is perpendicular to an extending direction of the perforation; the shaft seat is connected to the button seat; the button seat has a button that is able to return after the button is pressed by an external force; and the drive wheel as claimed in claim 6, the protruding portion of the connecting structure is inserted into the inserted hole of the shaft seat, and a pin is inserted into the perforation; the pin abuts against a side of the positioning groove to restrict the protruding portion from leaving the inserted hole, and the button is inserted into the recess, thereby detachably engaging the wheel hub motor and the quick-release assembly.

8. The quick-releasable drive wheel assembly as claimed in claim 7, wherein the quick-release assembly comprises a connecting rod, and the connecting rod has a plurality of positioning holes that is spaced and arranged along an axis of the connecting rod; the shaft seat is connected to a connecting frame, and the connecting frame fits around the connecting rod; the connecting frame has two fixing holes that are spaced and arranged along the axis of the connecting rod; when the two fixing holes on the connecting frame are aligned with two of the plurality of positioning holes on the connecting rod, each of fasteners is inserted through one of the two fixing holes and corresponding one of the plurality of positioning holes on the connecting rod to fix the shaft seat to the connecting rod; a position where the connecting frame is fixed to the connecting rod is adjustable by aligning the two fixing holes with different two of the plurality of positioning holes.

\* \* \* \* \*